(12) United States Patent
Tsvetkov et al.

(10) Patent No.: US 11,729,860 B2
(45) Date of Patent: Aug. 15, 2023

(54) METHOD OF VERIFYING AN OPERATION OF A MOBILE RADIO COMMUNICATION NETWORK

(71) Applicant: NOKIA SOLUTIONS AND NETWORKS OY, Espoo (FI)

(72) Inventors: Tsvetko Ivanchev Tsvetkov, Garching (DE); Janne Tapio Ali-Tolppa, Taufkirchen (DE); Henning Sanneck, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 373 days.

(21) Appl. No.: 15/559,528

(22) PCT Filed: Mar. 19, 2015

(86) PCT No.: PCT/EP2015/055786
§ 371 (c)(1),
(2) Date: Sep. 19, 2017

(87) PCT Pub. No.: WO2016/146192
PCT Pub. Date: Sep. 22, 2016

(65) Prior Publication Data
US 2018/0124867 A1      May 3, 2018

(51) Int. Cl.
*H04W 84/18* (2009.01)
*H04W 24/02* (2009.01)
(Continued)

(52) U.S. Cl.
CPC .......... *H04W 84/18* (2013.01); *H04B 17/318* (2015.01); *H04L 41/0803* (2013.01);
(Continued)

(58) Field of Classification Search
CPC ..... H04L 47/10; H04L 43/0817; H04L 43/08; H04W 28/16; H04W 16/10; H04W 36/0083
(Continued)

(56) References Cited

U.S. PATENT DOCUMENTS

2008/0310320 A1 * 12/2008 Kim .................... H04L 41/5022
370/252
2010/0105395 A1 * 4/2010 Ji ............................ H04W 8/26
455/444
(Continued)

FOREIGN PATENT DOCUMENTS

CN    103477673 A    12/2013
CN    103580898 A    2/2014
(Continued)

OTHER PUBLICATIONS

Minimum Vertex Coloring, Wolfram, Jul. 2014.*
(Continued)

*Primary Examiner* — Mahran Y Abu Roumi
(74) *Attorney, Agent, or Firm* — Squire Patton Boggs (US) LLP

(57) ABSTRACT

A method for verifying an operation of a mobile radio communication network is provided, wherein the method comprises sending an Initiation Message from a first network entity to a second network entity, the Initiation Message defining an undo request and comprising an UNDO section defining an undo area, a TRIGGERING_CM section indicating changes to the network, and an ASSISTANCE section; receiving an Assistance-Response Message, the Assistance-Response Message comprising the UNDO section, and an ASSISTED_CM section; and sending an Assis-
(Continued)

tance-Acknowledge Message including an ACK flag and the UNDO section from the first network entity to the second network entity.

12 Claims, 7 Drawing Sheets

(51) Int. Cl.
    *H04B 17/318*      (2015.01)
    *H04L 41/0803*      (2022.01)
    *H04W 48/18*      (2009.01)
    *H04Q 11/04*      (2006.01)
    *H04W 84/04*      (2009.01)

(52) U.S. Cl.
    CPC ........... *H04W 24/02* (2013.01); *H04W 48/18* (2013.01); *H04Q 11/0478* (2013.01); *H04W 84/042* (2013.01)

(58) Field of Classification Search
    USPC ......................................................... 709/224
    See application file for complete search history.

(56) References Cited

U.S. PATENT DOCUMENTS

| | | | | |
|---|---|---|---|---|
| 2010/0216467 | A1* | 8/2010 | Ryan | H04W 24/04 455/435.1 |
| 2011/0249641 | A1* | 10/2011 | Kwon | H04W 74/0858 370/329 |
| 2012/0016972 | A1* | 1/2012 | Tamura | H04L 41/0213 709/220 |
| 2013/0324076 | A1* | 12/2013 | Harrang | H04W 28/0284 455/405 |
| 2014/0040450 | A1* | 2/2014 | Sanneck | H04L 41/04 709/223 |
| 2014/0256335 | A1* | 9/2014 | Kobayashi | H04W 52/386 455/450 |
| 2014/0349661 | A1* | 11/2014 | Nuss | H04W 72/10 455/450 |
| 2015/0078344 | A1* | 3/2015 | Futaki | H04W 36/0083 370/332 |
| 2015/0106339 | A1* | 4/2015 | Hasan | H04L 41/0863 707/684 |
| 2015/0149627 | A1* | 5/2015 | Zhao | H04L 41/0886 709/224 |
| 2015/0365872 | A1* | 12/2015 | Dudda | H04W 36/0069 455/436 |
| 2015/0365954 | A1* | 12/2015 | Levine | H04W 72/06 455/450 |

FOREIGN PATENT DOCUMENTS

| | | |
|---|---|---|
| EP | 2 882 137 A1 | 6/2015 |
| WO | 2013/046502 A1 | 4/2013 |
| WO | 2014/198310 A1 | 12/2014 |
| WO | WO 2014/198310 A1 | 12/2014 |
| WO | 2015165525 A1 | 11/2015 |
| WO | 2016037637 A1 | 3/2016 |

OTHER PUBLICATIONS

Constraint Satisfaction method, Stanford, chapter 3 and 4, Jul. 2014.*
Tsvetko Tsvetkov et al; A Post-Action Verification Approach for Automatic Configuration Parameter Changes in Self-Organizing Networks; 6th International Conference on Mobile Networks and Management (MONAMI 2014), Wurzburg, Germany, Sep. 2014.
Peter Szilagyi et al; An Automatic Detection and Diagnosis Framework for Mobile Communication System; IEEE Transactions on Network and Service Management; vol. 9, No. 2, Jun. 2012.
Tsvetko Tsvetkov et al; A Configuration Management Assessment Method for SON Verification; IEEE 2014.
Tobias Bandh; Coordination of autonomic function execution in Self-Organizing Networks; PhD Thesis, Technische Jniversitat München, Apr. 2013.
Ericsson; Transparent Network-Performance Verification for LTE Rollouts; White Paper; Sep. 2012.
Toshiaki Yamamoto et al; Mobility Load Balancing Scheme based on Cell Reselection; The 8th International Conference on Wireless and Mobile Communications (ICWMC 2012); Venice, Italy, Jun. 2012.
Gabriela F. Ciocarlie et al; Managing Scope Changes for Cellular Network-level Anomaly Detection; IEEE 2014.
Pekka Kumpulainen et al; Finding 3G Mobile Network Cells with Similar Radio Interface Quality Problems; Springer 2011.
Seppo Hamalainen et al; LTE Self-Organising Networks (SON): Network Management Automation for Operational Efficiency; Wiley 2012.
Tsvetko, Tsvetkov et al., "A Post-Action Verification Approach for Automatic Configuration Parameter Changes in Self-Organizing Networks", 6th International Conference on Mobile Networks and Management, Sep. 2014, pp. 1-14.
Chinese Office Action corresponding to CN Application No. 201580080151.5, dated Nov. 20, 2020.
Chinese Office Action corresponding to CN Application No. 201580080151.5, dated Feb. 26, 2021.
Chinese Office Action corresponding to CN Application No. 201580080151.5, dated Apr. 1, 2020.
International Search Report & Written Opinion dated Nov. 16, 2015 corresponding to International Patent Application No. PCT/EP2015/055786.

* cited by examiner

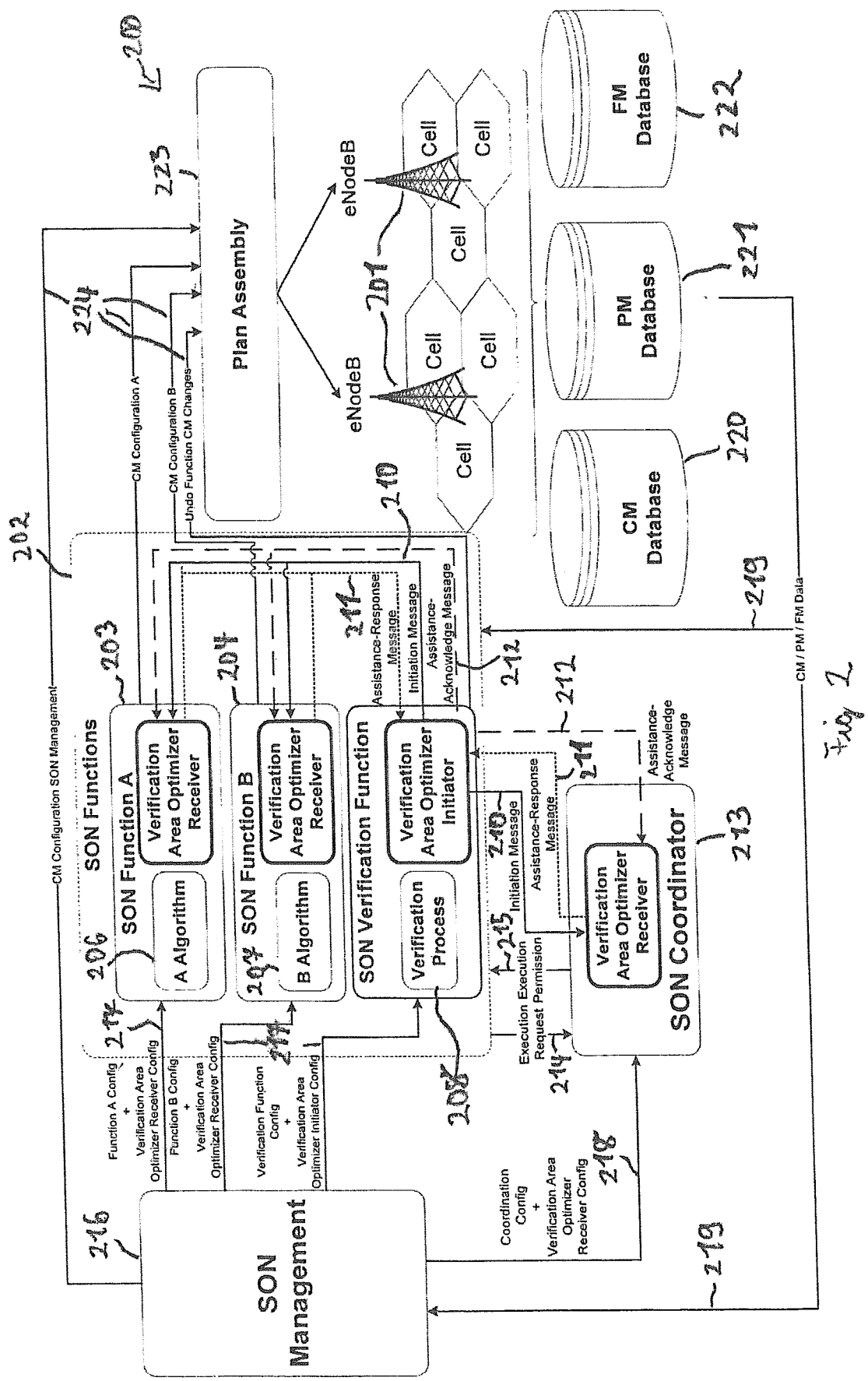

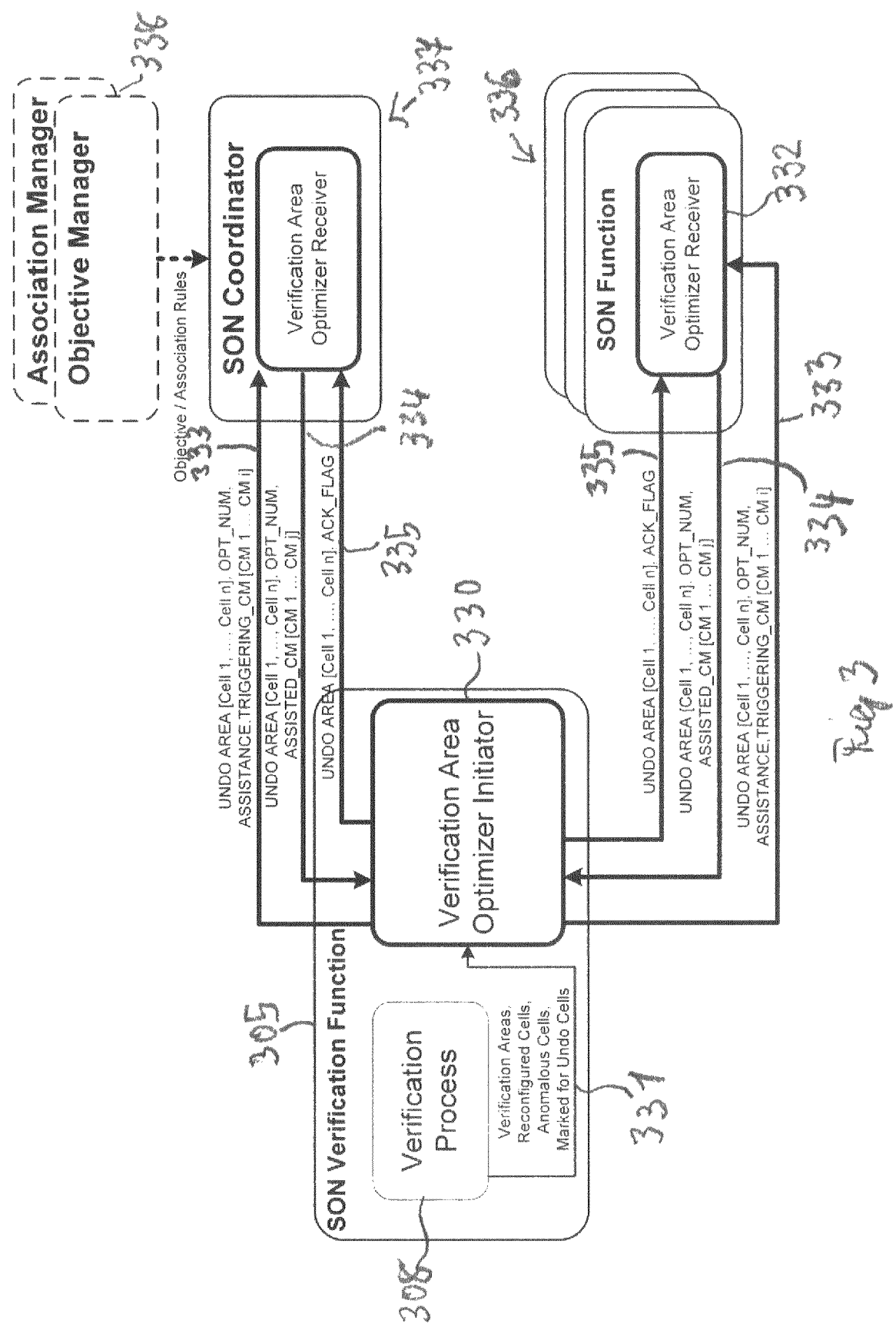

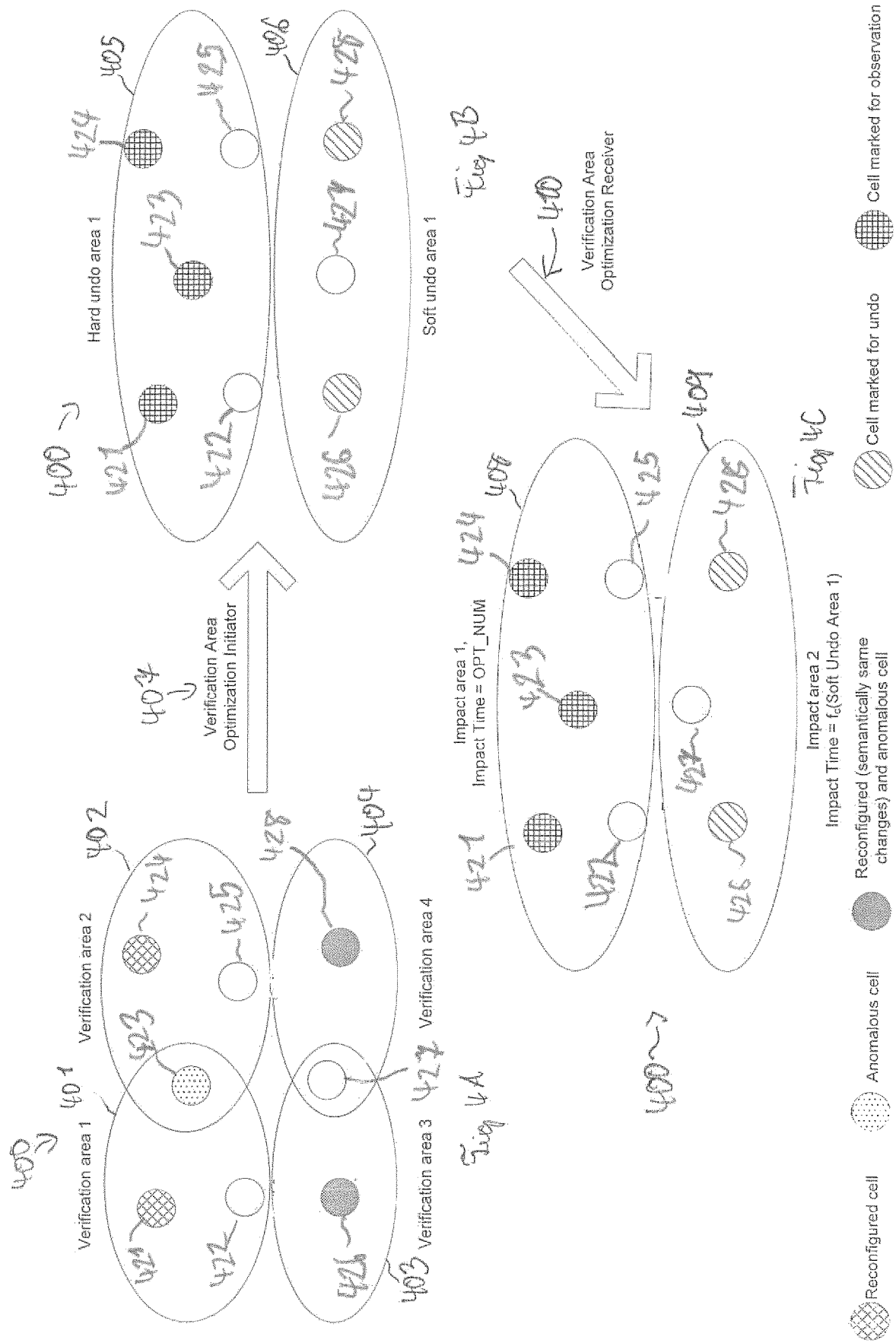

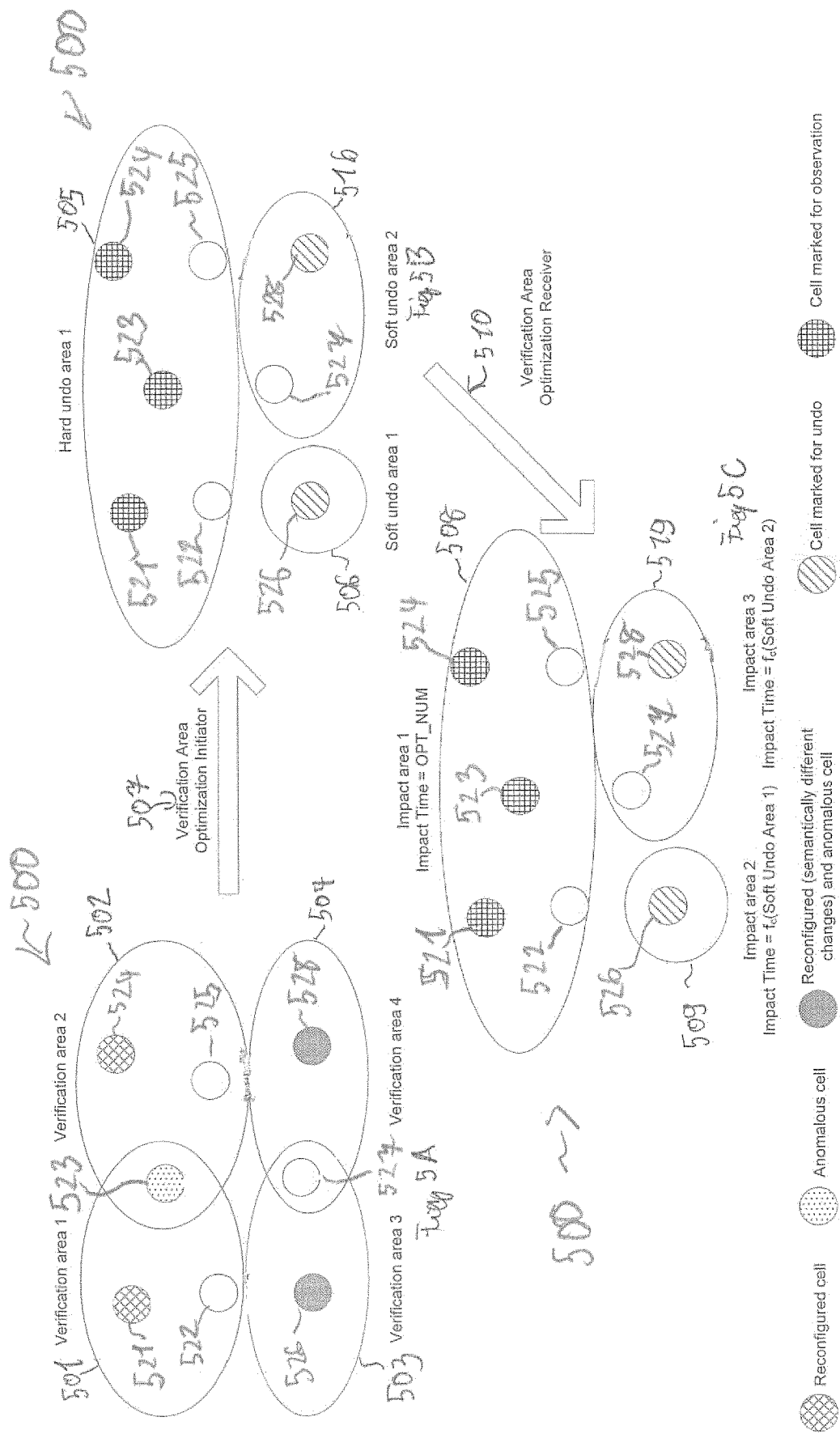

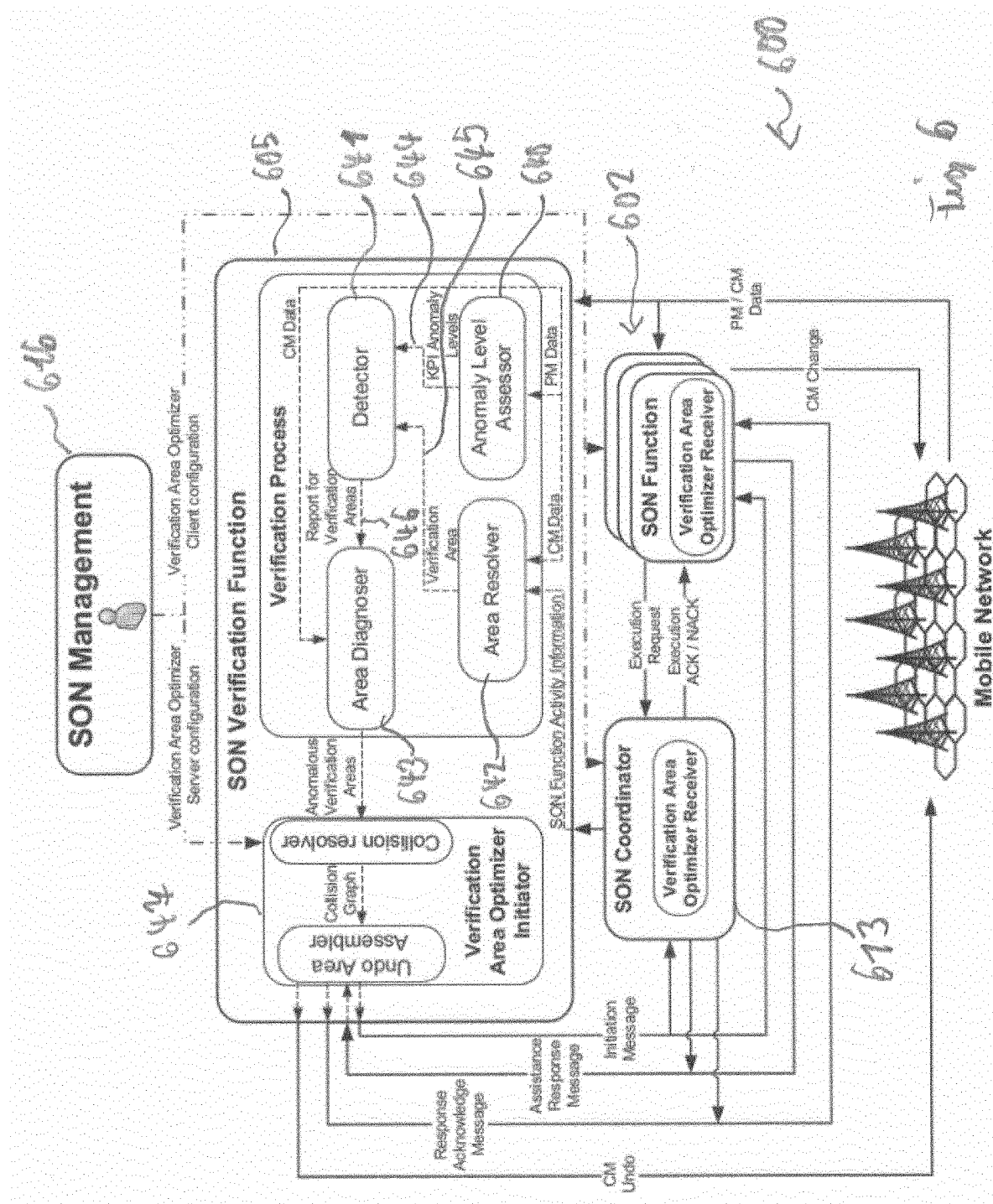

METHOD OF VERIFYING AN OPERATION OF A MOBILE RADIO COMMUNICATION NETWORK

FIELD OF INVENTION

The present invention relates to the field of verifying the operation of a mobile radio communication networks. In particular, the present invention relates to a method for verifying configuration changes in a mobile radio communication network, e.g., of a self-organizing network. Further, the present invention relates to a network entity configured to perform a method for optimized operation of a mobile radio communication network, e.g., a self-organizing network. Moreover, the present invention relates to a program element and a computer readable medium.

ART BACKGROUND

The total capital expenditures required to keep pace with consumer demands being placed on mobile radio communication networks or wireless networks is increasing significantly. As wireless networks become more complex and more ubiquitous, the costs associated with establishing, provisioning, and maintaining these networks continues to rise. One of the reasons these costs continue to rise is the high level of skill required to establish, manage, and maintain these networks. From the nascent stages of network design through the more mundane tasks of ensuring operability, highly skilled individuals play significant roles in the continued functioning of our wireless networks.

Recently, wireless communication providers have begun to automate some of the tasks associated with network provisioning and maintenance using self-organizing network (SON) techniques that self-configure, self-optimize, and self-heal. SON solutions are primarily being implemented in either the LTE access portion of eNodeBs, or within a central management node, but not on the backhaul portion of the eNodeBs. An eNodeB is the combined radio interface and radio network controller in an LTE station.

These prior implementations have drawbacks because, for example, when SON techniques occur only at the eNodeB level, each eNodeB has a limited view of the entire network. In most networks, an eNodeB does not see network operational parameters and environmental conditions external to itself. As a result, eNodeBs are typically limited in their ability to verify operational changes.

There may be a need for improving and verifying the operations in a mobile radio communication network.

SUMMARY OF THE INVENTION

This need may be met by the subject matter according to the independent claims. Advantageous embodiments of the present invention are described with the dependent claims.

According to an aspect a method of verifying an operation of a mobile radio communication network is provided, wherein the method comprises: sending an Initiation Message from a first network entity to a second network entity, the Initiation Message defining an undo request and comprising an UNDO section defining an undo area, a TRIGGERING_CM section indicating changes to the network, and an ASSISTANCE section; receiving an Assistance-Response Message, the Assistance-Response Message comprising the UNDO section, and an ASSISTED_CM section; and sending an Assistance-Acknowledge Message including an ACK flag and the UNDO section from the first network entity to the second network entity.

In particular, the UNDO section or field may define an (undo) area in which changes of configuration management (CM) parameters or changes of values of CM parameters may have to be undone in order to overcome some degradation of the network performance or some anomalies in a cell behavior or operation, for example. It should be noted that in case of verification collisions it may be difficult to distinguish which CM changes led to the degradation. Therefore, it may be advantageous to perform several undo requests in an iterative way in order to overcome the problem of determining which CM changes did cause the degradation and thus may provide a process for resolving verification collisions. The term "verification collision" may particularly denote that during a verification process of CM changes it cannot be uniquely determined which CM change caused a performance degradation. Such a verification collision may occur in case when two or more verification areas share cells showing anomalous behavior after a CM change, i.e. the corresponding two (or more) undo requests do not impact two disjoint sets of cells. Therefore, it cannot be determined for sure in a verification process which CM change did cause the anomalous behavior so that an uncertainty, whether a specific undo request overcomes the performance degradation, is given when the respective undo requests are executed.

In particular, the undo area may correspond to an area of the communication network which is impacted by the changes indicated in the TRIGGERING section. That is, the undo area may correspond to the area or cells which show irregular or anomalous behavior or operation after a change of values of one or several operation parameters. It should be noted that the UNDO section of the Assistance-Response Message and/or of the Assistance-Acknowledge Message may be modified compared to the one of the Initiation Message. For example, the undo area defined by the UNDO section may be modified, e.g., adapted to actual needs, actual circumstances and/or based on additional knowledge.

In particular, the TRIGGERING section or field may define configuration management changes that have triggered creation of a verification area comprising the undo area. Depending on the second network entity (e.g., whether it is a SON coordinator or a SON function) it may react in a different way on receiving the TRIGGERING section of the message.

In particular, the ASSISTANCE section or field may indicate how the second network entity or receiver shall act. For example, the ASSISTANCE section may define how the second network entity may help or assist in optimizing the network operation, e.g., by blocking in a given area (any) reconfiguration tasks, or block the given area for all function (potentially) except for functions requesting a change of the CM parameters listed in the TRIGGERING_CM section, or whether the first network entity requests for assistance in resolving a verification collision.

In particular, the ASSISTED_CM section or field may indicate whether the second network entity is able or will assist the first network entity in a collision resolving process, for example. For example, the ASSISTED_CM section or field may be part of or may form an assistance-response message. For example, it may as well describe how the second network entity may be able to resolve the undo request and/or may include or indicate some information concerning how to resolve the collisions.

The method may in particular be a computer implemented method. In particular, the network may be a self-organizing network.

In particular, the ACK-flag may have two states one of which indicates whether the first network entity acknowledge assistance of the second network entity or not.

In particular, the second network entity may form a receiver and may be a SON coordinator or a SON function, while the first network entity may be an initiator (e.g., a SON verification function), initiating the method for verifying an operation of a mobile radio communication network.

The term "verification area" or "observation area" may particularly denote a set of cells that are being under assessment, e.g., of a verification process. For example, such a verification process may comprise several steps, e.g., defining the scope (or the verification area) of the verification process, running an anomaly detection algorithm and diagnosing a (potential) problem.

By the described method some kind of "three-way handshake" may be defined which may enable that the method may be used in an environment (e.g., mobile radio communication network) even in case no SON coordinator is present. In particular, all network entities, e.g., SON function instances which may form one or several network entities of a same type as the second network entity, may be informed about ongoing verification while a collision resolving process may take place. Furthermore, the opportunity may be given for the second network entity to provide a better suggestion for resolving a verification collision, e.g., by sending back a corresponding ASSISTED_CM section. By providing such a three-way handshake it may be possible to address the issue of conflicting and overlapping CM undo requests.

According to a further aspect a method of verifying an operation of a mobile radio communication network is provided, wherein the method comprises receiving an Initiation Message from a first network entity at a second network entity, the Initiation Message defining an undo request and comprising an UNDO section defining an undo area, a TRIGGERING_CM section indicating changes to the network, and an ASSISTANCE section; creating and sending an Assistance-Response Message, the Assistance-Response Message comprising the UNDO section, and an ASSISTED_CM section; and receiving an Assistance-Acknowledge Message including an ACK flag and the UNDO section from the first network entity at the second network entity.

According to a further aspect a first network entity for a mobile radio communication network is provided, wherein the first network entity is configured to: send an Initiation Message to a second network entity, the Initiation Message defining an undo request and comprising an UNDO section defining an undo area, a TRIGGERING_CM section indicating changes to the network, and an ASSISTANCE section; receive an Assistance-Response Message, the Assistance-Response Message comprising the UNDO section, and an ASSISTED_CM section; and send an Assistance-Acknowledge Message including an ACK flag and the UNDO section to the second network entity.

According to a further aspect a second network entity for a mobile radio communication network is provided, wherein the second network entity is configured to: receive an Initiation Message from a first network entity, the Initiation Message defining an undo request and comprising an UNDO section defining an undo area, a TRIGGERING_CM section indicating changes to the network, and an ASSISTANCE section; create and send an Assistance-Response Message, the Assistance-Response Message comprising the UNDO section, and an ASSISTED_CM section; and receive an Assistance-Acknowledge Message including an ACK flag and the UNDO section from the first network entity.

According to a further aspect there is provided a computer program for verifying the operation of a mobile radio communication network. The computer program, when being executed by a data processor, is adapted for controlling and/or for carrying out the verification method of operating the mobile radio communication network as described above.

According to a further aspect there is provided a mobile radio communication network comprising at least one first network entity and at least one second network entity as described above.

According to a further aspect there is provided a method of categorizing cells of a mobile radio communication network, wherein the method comprises subsequent to a detection that a change in values of an operational parameter induces irregularities in the behavior of cells of a mobile radio communication network and that an undo of the change has to be performed by a plurality of cells categorizing the plurality of cells into two categories, wherein one category indicates that the undo can be performed simultaneously at all cells of this category and the other category indicates that the undo cannot be performed simultaneously at all cells of this category.

It should be noted that the undo requests can be performed simultaneously for all cells of the one category since this one category includes (only) semantically equivalent changes. In particular, the detection may be performed by a network entity or function which is different or the same as the one categorizing the cells.

In the following further exemplary embodiments of the method of verifying operation of a mobile radio communication network are described. However, the described features may also be combined with a network entity according to an exemplary aspect.

According to an exemplary embodiment of the method the Initiation Message further comprises an OPT_NUM section indicative for the way a corresponding undo request has to be handled.

In particular, the OPT_NUM section of the message may be associated with an undo area, which undo area may be defined by the UNDO section, and may define or indicate whether the undo requests defined by the respective Initiation Message can be safely executed (in particular at the same time) or whether some verification areas or undo areas may be in verification collision with each other so that the respective undo requests should not or cannot be performed at the same time, e.g., in order to avoid some verification collisions. For that the OPT_NUM section may define two states, e.g., indicate a soft undo area (indicating that the respective undo or verification areas may be safely undone at the same time since it consists of semantically equivalent changes) and a hard undo area (indicating that the respective undo or verification areas may not be safely undone at the same time).

According to an exemplary embodiment of the method the OPT_NUM section comprises a number indicative of an optimal number of time slots required to resolve collisions within the respective undo area.

In particular, the optimal number may be calculated or computed by the first network entity. For example, the optimal number may depend on the undo area (which may equal an impact area, i.e. an area impacted by the undo request) and may be equal to an impact time, i.e. the time the performing of undo actions are impacting or affect the operation in the respective undo area. In case of a soft undo area the OPT_NUM may be calculated at the maximum of the impact times of all verification areas combined in the undo area. For that a converter function may be used which takes as an input the verification areas used to build up the undo area.

For clarity reasons it should be mentioned that the respective feature (i.e. to calculate the optimal number of time slots and/or to define the state of the OPT_NUM section or field) may form a method independent of the three-way handshake described above or may be combined with the respective method.

A very important property may be the usage of the optimal number for computing the impact time of the CM undo operation in case of a hard undo area. At first, by doing so it may be possible to prevent other SON function instances, as well as any other entity that triggers CM changes, from interfering with the verification process. For instance, if two verification areas are defined that are in a conflict, i.e., they are part of a hard undo area, the opportunity may be given to the verification process to resolve the given conflicts without any interference from other functions. Second, there may not be an unnecessary blocking of cells for any optimization or configuration tasks since the optimal number may indicate the optimal time interval that is required for the verification process to complete.

According to an exemplary embodiment of the method the optimal number of the OPT_NUM section is calculated based on graph coloring theory or computed by constraint satisfaction methods.

In particular, a SON function or network entity (e.g., the first network entity) may depict the mobile radio communication network as a graph and applies minimum graph coloring in order to identify the set of cells whose CM settings may be safely undone. The parameter OPT_NUM may correspond to the chromatic number after coloring the graph. The graph itself is constructed as an undirected graph which comprises of a set of nodes depicting the verification areas and a set of edges, also called verification edges. Such edges are added to the graph after evaluating every pair of nodes: an edge is added when the corresponding verification areas are in a collision, i.e. they share at least one anomalous cell. In order to compute the aforementioned number, minimum graph coloring can be applied as described in [E. W. Weisstein, "Minimum Vertex Coloring From Math-World—A Wolfram Web Resource," Jul. 2014.] or by using constraint satisfaction methods [CONSTRAINT SATISFACTION PROBLEMS, Berkeley University].

According to an exemplary embodiment of the method the Assistance-Response Message comprises an OPT_NUM section indicative of an optimal number of time slots required to resolve collisions within the respective undo area.

In should be mentioned that the OPT_NUM and/or the optimal number associated with the respective OPT_NUM sections of the Initiation Message and the Assistance-Response Message may be different or may be equal. For example, the two optimal numbers may be different in case the second network entity may provide a better calculation or estimation or determining of the optimal number when resolving collisions.

According to an exemplary embodiment the method further comprises determining the undo areas and forming the UNDO section of the Initiation Message.

In particular, the undo areas may be determined by the first network entity or by a verification process running on another network entity, e.g., a SON management entity. For example, the first network entity may determine or calculate the undo areas based on information determined or received from another network entity, e.g., a SON Verification Function. The information may include several sets of data:

a) a set of all verification (observation) areas;
b) a set of all reconfigured cells;
c) a set of all anomalous cells; and
d) a set of all cells marked for an undo or rollback.

Based on these (received) information it may be determined which CM changes can be safely undone at the same time (soft undo areas) and the ones that may need further observations (hard undo areas).

According to an exemplary embodiment the method further comprises analyzing an impact of deployed CM changes on the mobile radio communication network.

The analyzing may be performed by a SON verification function which may be part of the first network entity (or a function implemented in the first network entity) or may be a network entity distinct to the first network entity or a function not implemented on the first network entity (but on another distinct network entity). In particular, the analyzing may take place after the deployed CM changes have been detected.

To achieve the task, a SON verification function may make use of four helper components: (1) an anomaly level assessor, (2) a detector, (3) an area resolver, and (4) an area diagnoser. The anomaly level assessor may allow to differentiate between normal and subnormal cell Key Performance Indicator (KPI) values. The output may be a KPI anomaly level which depicts the deviation of a KPI from its expectation. The area resolver may define the verification area that is going to be observed for anomalies. The detector uses the generated information from these two components to discover whether the performance of the given area is away from the expectations. Should this be the case, a performance report may be forwarded to the area diagnoser whose purpose may be to identify the CM changes responsible for the experienced anomaly.

According to an exemplary embodiment of the method the second network entity is a SON coordinator, wherein the SON coordinator adjust blocking rules for the UNDO area depending on information given in the ASSISTANCE section.

In particular, a SON coordinator may block the given undo area for any reconfiguration task requested by any network entity or SON function instance. Alternatively, a SON coordinator may block the given undo area for all functions except those requesting a change of CM parameters listed by the TRIGGERING_CM section or field so that these functions may be given the opportunity to provide a solution to a detected problem without any interference.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, C and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The methods or devices may be realized by a computer program respectively software. However, it may also be realized by one or more specific electronic circuits respectively hardware. Furthermore, it may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 2 schematically shows a mobile radio communication network and corresponding SON management according to an exemplary embodiment;

FIG. 3 schematically shows a three-way handshake between a Verification Area Optimizer Initiator and Verification Area Optimizer Receiver according to an exemplary embodiment;

FIG. 4 shows an example of a computation process of defining undo areas and impact areas;

FIG. 5 shows an example of a computation process of defining undo areas and impact areas; and FIG. 6 schematically shows a mobile radio communication network and corresponding SON management according to an exemplary embodiment;

DETAILED DESCRIPTION

Figure 1A:
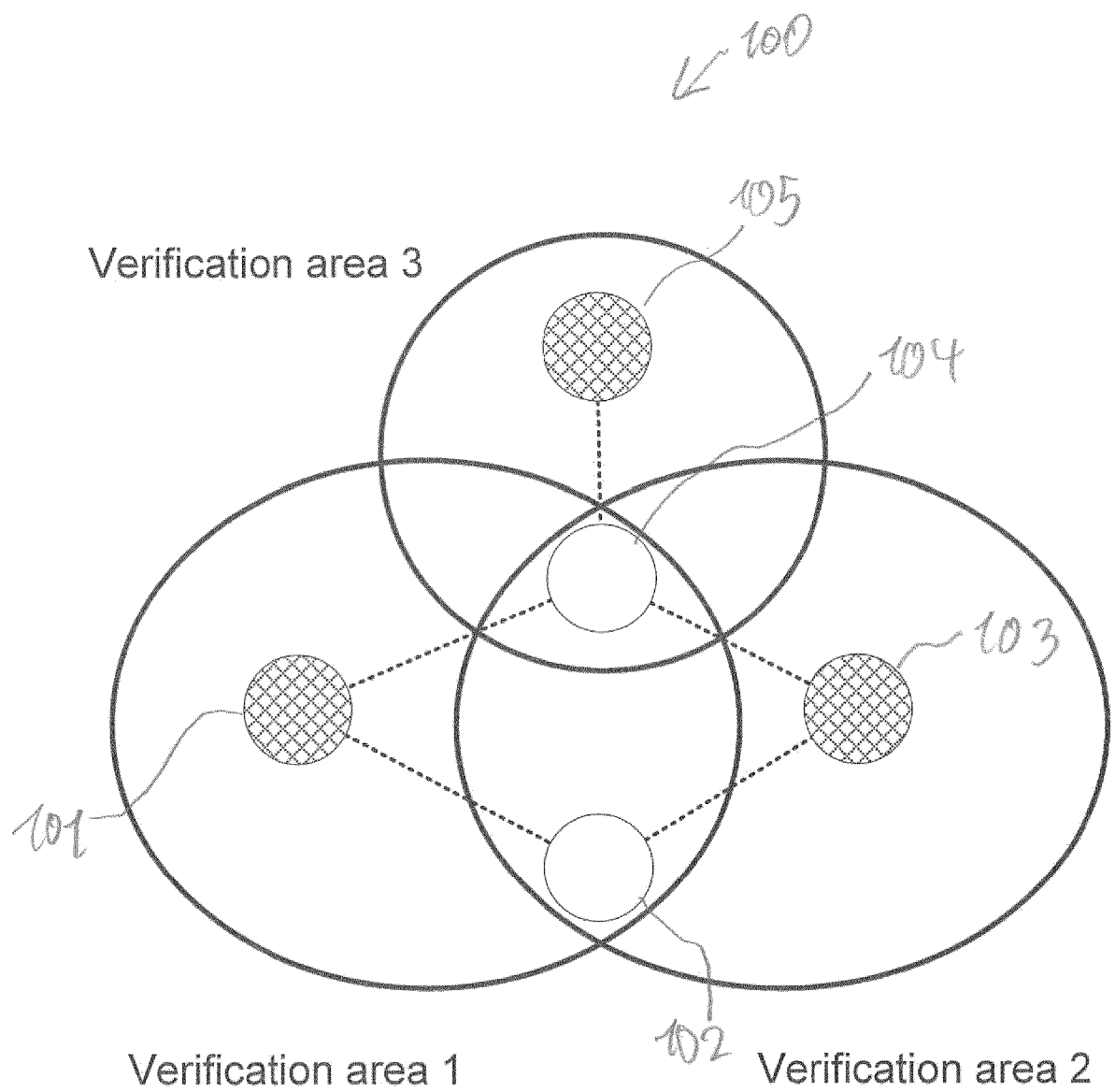
FIG. 1A and FIG. 1B schematically shows verification areas and impact areas.

The illustration in the drawing is schematical. It is noted that in different figures, similar or identical elements may be provided with reference signs, which are different from the corresponding reference signs only within the first digit.

In the following some general remarks concerning mobile radio communication networks in particular self-organizing networks are given which are helpful for understanding the present invention.

Self-Organizing Network (SON) features have been specified and developed to deal with the complex nature of network standards like Long Term Evolution (LTE) and LTE-Advanced. Those features usually target the optimal operation of the network, supervise the configuration and auto-connectivity of newly deployed Network Elements (NEs), and are in addition to that responsible for fault detection and resolution.

A SON-enabled network is typically managed by a set of autonomous functions performing specific Network Management (NM) tasks. These SON functions are designed as (closed) control loops which monitor Performance Management (PM) and Fault Management (FM) data, and based on their objectives adjust Configuration Management (CM) parameters. For instance, the Mobility Load Balancing (MLB) function tries to move traffic from high loaded cells to neighbors as far as coverage and interference allows by optimizing the Cell Individual Offset (CIO).

However, the increasing reliance on SON features to perform the correct optimization tasks introduces a new set of challenges. In a SON, the impact of each function's action on the environment depends upon the actions of other functions as well. For instance, if the Coverage and Capacity Optimization (CCO) function modifies the antenna tilt, the cell border changes physically which means that the received signal quality changes as well. Obviously, this affects the handover performance of the neighboring cells which is typically monitored by an optimization function like Mobility Robustness Optimization (MRO). Therefore, an inappropriate change of the physical cell borders induced by CCO may negatively impact the handover performance and, therefore, all upcoming decisions taken by the MRO function.

SON coordination can be considered as the first approach that has addressed these function dependencies. It defines rules used to avoid known conflicts between SON function instances. Three conflicts classes have been proposed: (1) configuration, (2) measurement, and (3) characteristic conflicts. The first type includes conflicts that occur when instances of SON functions operate on shared CM parameters. The second type addresses cases where the activity of one SON function instance affects the input measurements of another one. The third type deals with situations where two instances are in a direct conflict, e.g., both try to change the cell coverage area of two neighboring cells, or in a logical dependency, e.g., the above-mentioned CCO/MRO dependency.

The concept of SON coordination provides every function instance with two essential properties: the impact area and the impact time. The impact area consists of the function area (set of cells that are configured by the instance), the input area (set of cells where the instance takes its measurements from), the effect area (set of cells that are possibly affected by the activity of the instance), and the safety margin (an extension to the impact area). The impact time is defined as the additional time interval after the execution time, during which a SON function instance needs to be considered to allow a successful conflict detection and prevention. Every time a SON function instance decides to change a network parameter, it contacts the SON coordinator by sending a CM change request. The latter one acknowledges the change only if there has not been another conflicting function activity for the given impact area and time.

SON verification is a special type of anomaly detection. It aims at computing statistical measures on performance indicators at a relevant spatial and temporal aggregation level to assess the impact of a set of (SON-induced) CM changes. The verification process is a three step procedure comprising of (1) defining the scope, (2) running an anomaly detection algorithm, and (3) diagnosing the problem. During the first phase the verification area, also sometimes called an observation area, is computed which defines the set of cells that are being under assessment. A common technique is to compute a verification area by taking the impact area of the SON function instance whose activity is being under assessment. Furthermore, areas of dense traffic, difficult environments and known trouble spots can be considered during the selection process as well. Another possible solution is to consider the cell neighbor relations, e.g., by taking the first degree neighbors of the reconfigured cell.

During the second phase anomaly detection techniques are employed which may vary significantly in the underlying mathematical models and the assumptions about the data they are observing. For instance, in performance indicator normalization is used to detect whether cells are showing an expected behavior or not. During the third phase root cause analysis is performed with a possible outcome of a corrective action. Typically, this action is a CM undo of the network parameters that have caused an undesired network behavior. In addition, to improve the correctness of the diagnosis a scoring system can be used that rewards a corrective action if it has had a positive effect on the network.

An undo request may be sent to the SON coordinator when an anomaly is detected (e.g., degradation in performance). The impact area of the undo request equals the verification area since a coordinator has to prevent other functions from adjusting parameters for the area that is being under assessment. It should be mentioned that in the following the term coordination based CM undo approach refers to this kind of workflow. Furthermore, it should be noted that the term SON Verification Function which consists of the verification process as described above may as well be used for an entity that generates and executes CM undo requests.

The scheduling of CM undo actions may not be a trivial and often underestimated task. If this task is left to the SON coordinator, it may suppress undo actions that are in conflict with each other. This is caused by the fact that a coordinator does not have the knowledge to resolve such kind of conflicts. For example, if the verification mechanism has the desire to undo the antenna tilt change of two neighboring cells, one of them may get blocked because they are in a characteristic conflict.

Figure 1B:
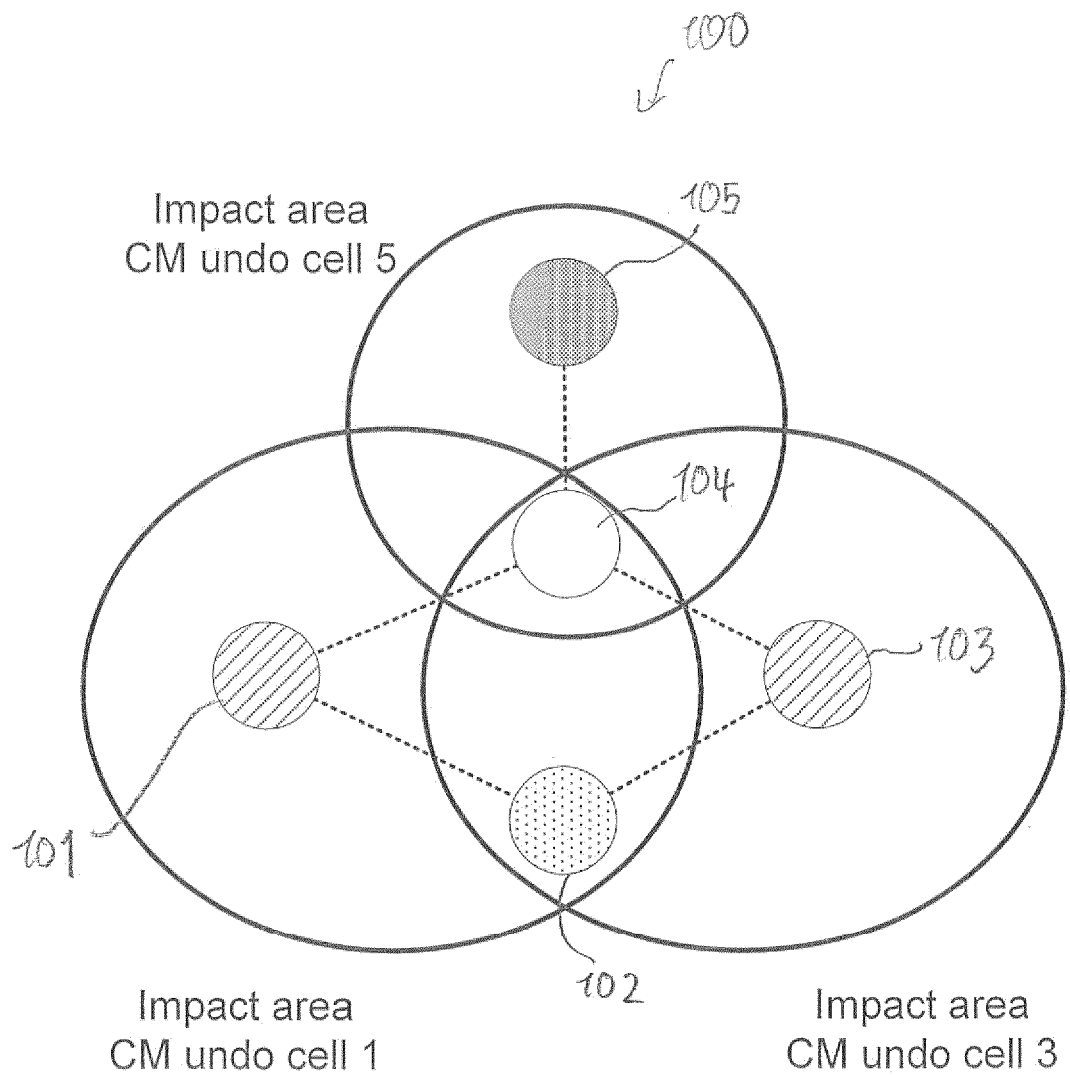

The coordination based CM undo approach has two major drawbacks for which an example is given in the following. Supposed that a network 100 consists of five cells, as shown in FIG. 1(a). The neighbors of a first cell 101 as well as of a third cell 103 are cells 102 and 104, and the neighbor of cell 105 is cell 104. For simplicity reasons, it is assumed that a single CM parameter has been changed within cells 101, 103, and 105. If the verification area is computed by taking the reconfigured cell and the direct neighbors, and cells 102 and 105 start to show an anomalous behavior, three overlapping undo requests as shown in FIG. 1(b) result. The question that arises here is how CM undo actions should be schedule, especially when they are in conflict with each other. In addition, how should verification collisions, i.e., situations in which there is an equivocality when scheduling several CM undo requests at the same time, like those of cell 101 and 103, should be treated.

One possible solution is to follow an aggressive approach by undoing all changes. The main disadvantage of this approach is the treatment of verification collisions. For example a change that was required and did not harm performance may be undone, e.g., the change made within cell 103 in FIG. 1(b) might not be the cause for the anomalous behavior of cell 102.

In contrast, a conservative strategy would perform a stepwise undo of the overlapping areas. If the simplified scenario from above is taken, it would mean that at first the CM change of cell 105 is undone, then the one of cell 101, and if required it is proceed with cell 3. Such an approach may work perfectly fine when a small number of overlapping verification areas and few active SON function instances are given. However, this changes as soon as those conditions are no longer met. Every time a CM parameter is undone, other SON functions instances may get active. For example, if a tilt change is undone, the MRO function running on a neighboring cell might get active to adapt the handover parameters. As a consequence, such an activity will interfere which may prevent the verification process from achieving its goal.

A possible way to improve the latter approach is to block the areas that are being under verification until all required CM undo actions are executed. For this purpose a SON coordinator is used to prevent other function instances from performing any changes for those areas. However, this is not applicable due to the high number of cells a verification area may have in real world setup.

A third approach is to ask the verification mechanism to resolve the experienced verification collisions. CM changes not causing any verification collisions can be safely undone at the same time whereas such leading to a verification collision have to be investigated more closely. For instance, a proposed known solution is to do a stepwise revert of the changes only which are causing the verification collisions. The used criteria for that is the execution time of the SON function instances that have been recently active, i.e., starting to undo the change of the instance that has most recently completed its execution. The process continues until the performance of the degraded cells starts to fall within the acceptable range. Nevertheless, this strategy just reduces the size of conflicting CM undo actions. In other words there may be still a set of verification areas that are in conflict with each other.

To address the problems stated above, a mechanism for uniting and verifying cell groups is proposed and described in the following. In principle such a mechanism may consist of two major components or network entities (or network functions): (1) a first network entity which may be denoted as a Verification Area Optimizer Initiator and (2) a second network entity which may be denoted as a Verification Area Optimizer Receiver. In the following the integration of these two entities in a SON-enabled network will be described first.

As depicted in FIG. 2, the Verification Area Optimizer may be integrated into the SON Verification Function whereas the Verification Area Optimizer Receiver may be included as part of every SON function instance that is either at the same or lower level of the SON Verification Function as well as the SON coordinator that is responsible for coordinating those instances. It should be noted that the term "level" is used to address the different layers of the Operation, Administration and Management (OAM) architecture that have been defined in the 3GPP OAM architecture: namely, the NE, Domain Management (DM), and the NM level.

In particular, FIG. 2 shows a schematic mobile radio communication network 200 comprising at the one side eNodeBs 201 forming cells of the communication network 200. On the other side SON functions 202 are provided for organizing the processes in the communication network. Just as examples, three SON functions 203, 204 and 205 are schematically depicted in FIG. 2, wherein 203 and 204 are typical SON functions implementing algorithms 206 and 207 and functioning in the example as Verification Area Optimizer Receiver, while the SON function 205 functions as a SON Verification Function implementing a verification process 208 and functioning in the example as Verification Area Optimizer Initiator.

Therefore, SON function 205 is configured to send an Initiation Message (indicated by arrows 210) to the other SON functions while the other SON functions sends back Assistance-Response Messages (indicated by arrows 211), which is answered by the SON Verification Function by an Assistance-Acknowledge Message (indicated by arrows 212). The same messages can be sent/received by the SON Verification Function to/from another Verification Area Optimizer Receiver 213 functioning as an (optional) SON Coordinator, which may as well receive execution requests (arrow 214) and send execution permissions (arrow 215) to the SON functions 202.

In addition a SON Management 216 are shown in FIG. 2 which communicate with the SON functions 203 to 205 in order to perform necessary configurations of these functions and to enable the same to function as Verification Area Optimizer Receivers (indicated by arrows 217). At the same time it communicates with the SON Coordinator 213 to configure the same (arrow 218).

Furthermore, the SON Management and the SON Functions are in communication (indicated by arrow 219) with CM, PM and FM databases (220, 221, and 222) and with the eNodeBs via a plan assembly 223 (indicated by arrows 224) to perform respective CM configurations and/or changes and/or undo requests.

In the following the first network entity or initiator and the second network entity or receiver will be described in more detail. In addition to that, an example is given as to how the two components interact with each other and it is outlined as to how a message exchange between them functions.

The Verification Area Optimizer Initiator 330 is realized as being part of the SON Verification Function 305, as shown in FIG. 3. In case of a network anomaly (e.g., degradation in performance), the verification process 308 contacts (indicated by arrow 331) the Verification Area Optimizer Initiator by forwarding four essential information entities:

The set of all verification (observation) areas
The set of all reconfigured cells
The set of all anomalous cells
The set of all cells marked for an undo/rollback.

Based on the received information, the initiator identifies which CM changes can be safely undone at the same time and such that need further observations. The outcome of this component is a set of undo areas. Furthermore, an undo area can classified as a hard or a soft undo area.

A hard undo area is the union of two or more verification areas that are in a verification collision with each other, i.e., it comprises of verification areas that cannot be safely undone at the same time. The intersection of such areas consists of cells that have not been reconfigured but are showing an anomalous behavior. Therefore, such areas need further observations since the diagnosis component of the verification process needs more than one step to resolve them. It should be noted that by using the term "undoing a verification area" it is referred to the fact of undoing all CM changes within that area that have been marked by the verification process as responsible for its anomalous behavior. Furthermore, when combining two or more verification areas into a hard undo area, the initiator computes a so-called optimal number that preferably equals the optimal number of slots that are required to resolve the collisions within the given undo area. A slot is to be understood as a time unit. This number is used by the Verification Area Optimizer Receivers to block the areas for any configuration tasks. More details about this will be given later with respect to the description of the receiver.

A soft undo area on the other side comprises of two or more verification areas that can be safely undone at the same time. The process of creating soft undo areas depends on the CM changes marked for an undo. More precisely, it depends on the semantics of those changes, i.e., a soft undo area can be also thought as a semantical undo area. The semantic of a CM parameter provides rules for interpreting its change and resulting impact on the network. For example, the adjustment of the antenna tilt and the transmission power within a cell requires the change of two different CM parameters which, however, can have the same semantical interpretation since both impact the network in a similar manner: they physically change the border of a cell. On the contrary, verification areas including semantically different changes are preferably kept separate, since the corresponding undo actions have a different impact on the network. For example, the undo of a transmission power change might have a much longer impact time than an undo of the CIO parameter.

Furthermore, a soft undo area can be constructed by taking the subset of one verification area or the union of two or more verification area subset. For instance, if the diagnosis component of the verification process determines that the impact of a CM undo actions have changed over time, the soft undo area can be constructed by taking only a subset of the corresponding verification areas.

The Verification Area Optimizer Receiver is responsible for translating a given undo area and optimal number into an impact area and time for the given CM undo request. The impact area equals the undo area, however, the way of how the impact time is computed depends on whether the undo area is a hard or a soft one, as follows:

In case of a hard undo area: the impact time equals optimal number.
In case of a soft undo area: the impact time is computed by a converter function $f_c$ which takes as an input the verification areas used to build up the undo area. For instance, $f_c$ may take the maximum of the impact times of all united verification areas.

An important property here is the usage of the optimal number for computing the impact time of the CM undo operation in case of a hard undo area. At first, it may be possible to prevent other SON function instances, as well as any other entity that triggers CM changes, from interfering with the verification process. For instance, if there are two verification areas that are in a conflict, i.e., they are part of a hard undo area, the opportunity will be given to the verification process to resolve the given conflicts without any interference from other functions. Second, there will not be an unnecessary blocking of cells for any optimization or configuration tasks since the optimal number gives us the optimal time interval that is required for the verification process to complete.

An addition, it should be noted that the advantages remain for soft undo areas as well since cells marked for a CM undo are not reconfigured by any other SON function instance and such not being part of the undo area are not unnecessarily blocked.

Furthermore, by partitioning the verification areas into hard and soft undo areas, CM undo action requests are no longer in a conflict and will not be suppressed as it is the case with the coordination based CM undo approach known in the prior art.

Now a message flow and a corresponding parameter negotiation will be explained. The communication between the Verification Area Optimizer Initiator 330 and the Verification Area Optimizer Receivers 332 is shown in FIG. 3.

The process is started by the initiator by sending an Initiation Message 333. The receiver sends an Assistance-Response Message 334 which is followed by an Assistance-Acknowledge Message 335 issued by the initiator. At the end, a message flow that resembles a three-way handshake is defined. The messages may be structured as follows:

Initiation Message
- UNDO AREA [Cell 1, . . . , Cell n]: an undo area consisting of Cell 1 to Cell n.
- OPT_NUM: the optimal number as defined above. OPT_NUM may assume two stages, e.g. a value of 0 indicates that the undo area is a soft one and that the given CM undo requests can be safely executed, i.e., the given verification areas are not in a collision. A value higher than 0 shows that the given undo area is a hard one.
- TRIGGERING_CM [CM 1, . . . , CM i]: includes the CM changes that have triggered the creation of the verification areas comprising the undo area. If the receiver is a SON function instance 336, it can spot whether its changes are listed. If the receiver is a SON coordinator 337, it can adjust the blocking rules for the given area, depending on the ASSISTANCE field.
- ASSISTANCE: can be NONE, COORDINATION or COLLISION_RESOLVING. How the value is interpreted depends on the receiver side, as follows:
  - Receiver is a SON coordinator: COORDINATION indicates that the SON coordinator has to block the given area for any reconfiguration tasks requested by any SON function instances. COLLISION_RESOLVING on the other side indicates that the SON coordinator has to block the given area for all functions except those requesting a change of the CM parameters listed by the TRIGGERING_CM filed. In this way the opportunity will be given to those functions to provide a solution to the detected problem without any interference.
  - Receiver is an instance of a SON function: COLLISION_RESOLVING indicates whether the initiator needs assistance from the function for resolving a verification collision. In case the assistance field includes NONE, this means that the message is only informative and no further assistance is required by the receiver. It should be noted that the assistance field can include COORDINATION which is only useful in the cases where no SON coordinator is present in the network. In this way functions not participating in the collision resolving process will get informed about the ongoing verification collision and discontinue any reconfiguration tasks for the given area. In case the Verification Area Optimizer Receiver gets an Initiation Message including a hard undo area, (i.e., OPT_NUM≠0) and an assistance field containing COLLISION_RESOLVING, it is obligated to send an Assistance-Response Message to the initiator informing whether it will assists it in resolving the verification collision.

The message may be structured as follows:

Assistance-Response Message
- UNDO AREA [Cell 1, . . . , Cell n]: the undo area consisting of Cell 1 to Cell n, as listed in the Initiation Message.
- ASSISTED_CM [CM 1, . . . , CM j] the CM parameters for which the receiver will assist the initiator. It should be noted that the listed parameters can be less than those listed in the Initiation Message if the receiver is able to only partially assist the initiator.
- OPT_NUM the optimal number of the given hard undo area. It should be noted that this number can differentiate from the one suggested in the Initiation Message if the sender of the Assistance-Response Message is able to provide a better optimal number for resolving the collision.

The Verification Area Optimizer Initiator is responsible for sending an Assistance-Acknowledge Message to the receivers after getting an Assistance-Response Message.

The message is structured as follows:

Assistance-Acknowledge Message
- UNDO AREA [Cell 1, . . . , Cell n]: the undo area consisting of Cell 1 to Cell n, as listed in the Assistance-Response Message.
- ACK FLAG: indicates whether the initiator acknowledges the assistance from a SON function instance for resolving the verification collision.

The presented three-way handshake may allow that the method is used in an environment without a SON coordinator present. All SON function instances will be informed about the ongoing verification while a collision resolving process is taking place. Furthermore, the opportunity is given to the receiver to provide a better suggestion for resolving a verification collision. In addition to that, a crucial design feature may be the ability to negotiate the same parameters with a SON coordinator. A coordinator may work closely with an objective manager 338 or an auto-configuration entity. They can provide additional information that can help resolve the collisions as shown by the dotted lines in FIG. 3.

In the following an exemplary example of a network 400 is described in context of FIG. 4. In particular, FIG. 4 shows an example how the computation process might look like. Assumed that due to SON activity eight cells 421 to 428 are defined and four of them (cells 421, 424, 426, and 428) have been reconfigured. Furthermore, it is assumed that a verification area consisting of the reconfigured cell as well as all of its direct neighbors. Due to those CM changes, three cells start to show an anomalous behavior: cells 423, 426, and 428. Since verification area 1 (401) and 2 (402) (FIG. 4A) share a common anomalous cell, they are marked as being in a verification collision and are united into a hard undo area 405 by the Verification Area Optimization Initiator (indicated by arrow 407).

Verification areas 3 (403) and 4 (404) on the other side do not share any anomalous cells and are, therefore, marked as collision free. In the first example shown in FIG. 4B the changes within cell 6 and 8 are semantically equivalent which leads the corresponding verification areas to be united in a soft undo area 406. Therefore, the hard undo area 405 and the soft undo area 406 correspond to an impact area 408 and 409, respectively which may be determined by the Verification Area Optimizing Receiver (as indicated by arrow 410).

In the second example of a network 500 (comprising eight cell 521 to 528 grouped in four verification areas 501 to 504) depicted in FIG. 5 and similar to the one shown in FIG. 4 (and therefore not described in detail again) the changes within cell 526 and 528 are semantically different. In addition, the diagnosis component of the verification process has determined that only cell 527 is impacted by the CM undo operation of cell 528, which leads to two soft undo areas: one (506) that includes cell 526 and one (516) that consists of cell 527 and 528, corresponding to two impact areas 509 and 519, respectively. Moreover a hard undo area 505 (comprising five cells 521 to 525) corresponds to an impact area 508.

The resulting impact areas and times are presented in the very same figures.

The presented three-way handshake between the Verification Area Optimizer Initiator and Receivers may provide an additional layer of robustness to the verification process and collision resolving capability. In other words, it may suppress CM undo requests. In particular, it may not be necessary anymore to rely solely on a SON coordinator to resolve verification collisions which may not be feasible, since it is does not have the knowledge to schedule unknown conflicting actions.

In addition it may provide network layer independence. One possible cause for verification collisions is the location of the verification mechanism. In order to have a wide view on the mobile network and the running SON function instances, the SON Verification Function resides at the DM or even the NM level of the OAM architecture. However, being at that level prevents a verification mechanism from being able to instantly verify the action of every running SON function instance in the network, i.e., it creates a potential for verification collisions. By having a verification collision resolving mechanism as provided by the method according to an exemplary embodiment, this may no longer be an issue.

Furthermore, the method may provide for SON coordinator independence. The introduced CM undo scheduling approach is not dependent on the availability of a SON coordinator. In case the SON system does not include a mechanism for SON coordination, it still may be able to provide a solution to the known problems.

Moreover, robust verification in modern mobile networks may be enabled. A reason verification collisions to occur is the high number of network cell adjacencies, i.e., cell neighborships where a handover can potentially occur. Cells in a mobile communication network tend to have a high number of neighbors which is due to several reasons. As in every technology, the size of a cell shrinks and as a result, there are more neighboring cells (including cells from other technologies towards which handovers are also possible, i.e., requiring adjacency definitions). A high number of neighbor relations can be also caused by the cell density.

Furthermore, compatibility with state of the art optimization tools may be enabled. Offline optimization, i.e. waiting until all required data is collected out of the network, running the optimization algorithm, and manually deploying the resulting CM change sets on the network is still a common practice today. As a consequence, those changes may be considered by the SON Verification Function as occurring at the same time which creates a potential for verification collisions.

Some additional remarks concerning implementation are given in the following. An overview of an exemplary implementation is given in FIG. 6 which is very similar to the network shown in FIG. 2 but does point out some more details of a SON Verification Function 605. For that reason FIG. 6 is substantially only described with respect to the specific implementation of the SON Verification Function 605. At the very bottom, the SON-enabled mobile network 600 is depicted. PM and CM data is regularly exported from the network and fed into the available SON functions 602 as well as the SON Verification Function 605. The SON functions can be numerous, e.g., MRO, MLB, CCO, Automatic Neighbor Relation (ANR). In case they have the desire to perform a CM change, they will request the SON coordinator 613 for permission to do so.

After detecting deployed CM changes, the SON Verification Function 605 gets active to analyze their impact on the network. To achieve its task, it makes use of four helper components: (1) an anomaly level assessor 640, (2) a detector 641, (3) an area resolver 642, and (4) an area diagnose 643. The anomaly level assessor allows to differentiate between normal and subnormal cell Key Performance Indicator (KPI) values. The output is a KPI anomaly level 644 which depicts the deviation of a KPI from its expectation. The area resolver defines the verification area 645 that is going to be observed for anomalies. The detector uses the generated information from these two components to discover whether the performance of the given area is away from the expectations. Should this be the case, a performance report 646 is forwarded to the area diagnoser whose purpose is to identify the CM changes responsible for the experienced anomaly.

The verification area union approach that may be used, as part of the Verification Area Optimizer Initiator 647, builds upon graph coloring theory. It depicts the mobile network as a graph and applies minimum graph coloring in order to identify the set of cells whose CM settings can be safely undone. The parameter OPT_NUM corresponds to the chromatic number after coloring the graph. The required messages are then sent to the SON coordinator and the SON function instances. It should be noted that the Verification Area Optimizer Initiator and Receivers are configurable by the operator (SON management 614 in the figure).

It is noted that it may also be possible in further refinements of the invention to combine features from different illustrative embodiments described herein. It should also be noted that reference signs in the claims should not be construed as limiting the scope of the claims.

LIST OF REFERENCE SIGNS

100 Network
101-105 Cells
200 Mobile radio communication network
201 eNodeB
202 SON functions
203-205 SON functions
206,207 SON algorithm
208 Verification process
210-212 Arrows
213 Verification Area Optimizer Receiver
214-215 Arrows
216 SON management
217-219 Arrows
220-222 Databases
223 Plan assembly
224 Arrows
305 SON Verification Function
308 Verification process
330 Verification Area Optimizer Initiator
331 Arrow
332 Verification Area Optimizer Receivers
333 Initiation message
334 Assistance-response message
335 Assistance-acknowledge message
336 SON function instance
337 SON coordinator
338 Objective manager
400 Network
401-404 Verification areas 405 Hard undo area
406 Soft undo area
407 Arrow
408, 409 Impact areas
410 Arrow
421-428 Cells
500 Network
501-504 Verification areas
505 Hard undo area
506 Soft undo area
507 Arrow
508, 509 Impact areas
510 Arrow
516 Soft undo area
519 Impact area
521-528 Cells
600 Mobile radio communication network
602 SON functions
605 SON Verification function
206,207 SON algorithm
613 Verification Area Optimizer Receiver
616 SON management
640 Anomaly level assessor
641 Detector
642 Area resolver
643 Area diagnoser
644 KPI anomaly level
645 Verification area
646 Performance report
647 Verification Area Optimizer Initiator

The invention claimed is:

1. A method of verifying an operation of a mobile radio communication network, the method comprising:
sending an Initiation Message from a first network entity to a second network entity, the Initiation Message defining an undo request and comprising an UNDO section defining an undo area, a TRIGERRING_CM section indicating changes to the network, and an ASSISTANCE section indicating an action for the second network entity;
receiving an Assistance-Response Message, the Assistance-Response Message comprising the UNDO section, and an ASSISTED_CM section, the ASSISTED_CM section indicating whether the second network entity is configured to assist the first network entity in determining which configuration management change caused a performance degradation; and
sending an Assistance-Acknowledge Message including an ACK flag and the UNDO section from the first network entity to the second network entity.

2. The method according to claim 1, wherein the Initiation Message further comprises an OPT_NUM section indicative for the way a corresponding undo request has to be handled.

3. The method according to claim 2, wherein the OPT_NUM section comprises a number indicative of an optimal number of time slots required to resolve collisions within the respective undo area.

4. The method according to claim 3, wherein the optimal number of the OPT_NUM section is calculated based on graph coloring theory or computed by constraint satisfaction methods.

5. The method according to claim 2, wherein the Assistance-Response Message comprises an OPT_NUM section indicative of an optimal number of time slots required to resolve collisions within the respective undo area.

6. The method according to claim 1, further comprising determining the undo areas and forming the UNDO section of the Initiation Message.

7. The method according to claim 1, further comprising analyzing an impact of deployed CM changes on the mobile radio communication network.

8. A method of verifying an operation of a mobile radio communication network, the method comprising:
receiving an Initiation Message from a first network entity at a second network entity, the Initiation Message defining an undo request and comprising an UNDO section defining an undo area, a TRIGERRING_CM section indicating changes to the network, and an ASSISTANCE section indicating an action for the second network entity;
creating and sending an Assistance-Response Message, the Assistance-Response Message comprising the UNDO section, and an ASSISTED_CM section, the ASSISTED_CM section indicating whether the second network entity is configured to assist the first network entity in determining which configuration management change caused a performance degradation; and
receiving an Assistance-Acknowledge Message including an ACK flag and the UNDO section from the first network entity at the second network entity.

9. The method according to claim 8, wherein the second network entity is a SON coordinator, wherein the SON coordinator adjust blocking rules for the UNDO area depending on information given in the ASSISTANCE section.

10. A first network entity for a mobile radio communication network, wherein the first network entity is configured to:
send an Initiation Message to a second network entity, the Initiation Message defining an undo request and comprising an UNDO section defining an undo area, a TRIGERRING_CM section indicating changes to the network, and an ASSISTANCE section indicating an action for the second network entity;
receive an Assistance-Response Message, the Assistance-Response Message comprising the UNDO section, and an ASSISTED_CM section, the ASSISTED_CM section indicating whether the second network entity is configured to assist the first network entity in determining which configuration management change caused a performance degradation; and
send an Assistance-Acknowledge Message including an ACK flag and the UNDO section to the second network entity.

11. A second network entity for a mobile radio communication network, the second network entity configured to:
receive an Initiation Message from a first network entity, the Initiation Message defining an undo request and comprising an UNDO section defining an undo area, a TRIGERRING_CM section indicating changes to the network, and an ASSISTANCE section indicating an action for the second network entity;
create and send an Assistance-Response Message, the Assistance-Response Message comprising the UNDO section, and an ASSISTED_CM section, the ASSISTED_CM section indicating whether the second network entity is configured to assist the first network entity in determining which configuration management change caused a performance degradation; and
receive an Assistance-Acknowledge Message including an ACK flag and the UNDO section from the first network entity.

12. A computer program embodied on a non-transitory computer-readable medium for optimizing and verifying an operation of a mobile radio communication network, wherein the computer program, when being executed by a data processor, is adapted for controlling or for carrying out the optimization method according to claim 1.

* * * * *